(12) United States Patent
Yajima et al.

(10) Patent No.: US 7,825,916 B2
(45) Date of Patent: Nov. 2, 2010

(54) CONTROLLER, MOBILE TERMINAL APPARATUS, AND PROGRAM

(75) Inventors: Hideaki Yajima, Osaka (JP); Hidehiko Shin, Osaka (JP)

(73) Assignee: Panasonic Corporation, Osaka (JP)

( * ) Notice: Subject to any disclaimer, the term of this patent is extended or adjusted under 35 U.S.C. 154(b) by 974 days.

(21) Appl. No.: 11/597,212

(22) PCT Filed: Dec. 9, 2005

(86) PCT No.: PCT/JP2005/022666

§ 371 (c)(1),
(2), (4) Date: Nov. 21, 2006

(87) PCT Pub. No.: WO2006/126297

PCT Pub. Date: Nov. 30, 2006

(65) Prior Publication Data

US 2008/0036754 A1    Feb. 14, 2008

(30) Foreign Application Priority Data

May 26, 2005    (JP) .............................. 2005-154537

(51) Int. Cl.
*G06F 3/038* (2006.01)
(52) U.S. Cl. ................................. 345/204
(58) Field of Classification Search ............... 345/156, 345/169, 204; 455/566; 714/47, 44, 57; 715/864, 866; 463/24
See application file for complete search history.

(56) References Cited

U.S. PATENT DOCUMENTS

| 5,027,269 A | 6/1991 | Grant et al. |
| 5,121,486 A | 6/1992 | Kurihara et al. |
| 5,727,142 A | 3/1998 | Chen |
| 5,852,650 A * | 12/1998 | Hyyrynen et al. ......... 379/29.01 |
| 5,896,402 A * | 4/1999 | Kurobe et al. ................ 714/748 |
| 6,072,465 A * | 6/2000 | Maeda et al. ................ 345/156 |
| 2005/0176493 A1* | 8/2005 | Nozaki et al. .................. 463/24 |

FOREIGN PATENT DOCUMENTS

| JP | 1-197850 | 8/1989 |
| JP | 3-63744 | 3/1991 |
| JP | 10-69446 | 3/1998 |
| JP | 2002-108657 | 4/2002 |
| JP | 2002108657 | * 4/2002 |

\* cited by examiner

*Primary Examiner*—Chanh Nguyen
*Assistant Examiner*—Allison Walthall
(74) *Attorney, Agent, or Firm*—Wenderoth, Lind & Ponack, L.L.P.

(57) ABSTRACT

Provided is a controller capable of preventing unnecessary contents from being displayed in a period from when a failure occurs on a terminal apparatus to when the failure is restored. When a failure monitoring section detects that a failure has occurred on a display control section, failure detection information is outputted to a display update control section. The display update control section, in response to the outputted failure detection information, suspends updating a display, which is performed by a display section. And when a restoration monitoring section detects that the display control section has been restored from the failure, restoration detection information is outputted to the display update control section. The display update control section controls the display section so as to suspend updating the display in response to the failure detection information and starts updating the display in response to the restoration detection information.

10 Claims, 10 Drawing Sheets

CONTROLLER, MOBILE TERMINAL APPARATUS, AND PROGRAM

TECHNICAL FIELD

The present invention relates to a mobile terminal apparatus and a program, and more particularly, to a controller, a mobile terminal apparatus, and a program which control a display on a screen.

BACKGROUND ART

Conventionally, there has been known a failure restoration method which enhances a user's convenience by resuming a display, after a screen display apparatus has been restored from a failure, starting from contents which had been displayed on the screen display apparatus when the failure occurred (for example, refer to patent document 1).

FIG. 9 is a block diagram showing main parts of a display system which realizes a conventional failure restoration method disclosed in the patent document 1. In FIG. 9, the display system comprises a display controller 902, a display apparatus 903, and a monitor 904.

The display controller 902 schedules a display for various contents received externally, which is outputted to the display apparatus 903 while switching the various contents to be displayed on a screen. When switching the contents to be displayed on the screen, the display controller 902 transmits to the monitor 904 the contents to be displayed as screen switching information.

The display apparatus 903 has a screen such as a display and displays the contents outputted from the display controller 902 on the screen.

The monitor 904 monitors the display controller 902, detects a failure occurring on the display controller 902, and restores the failed display controller 902. More specifically, the monitor 904 receives the screen switching information outputted from the display controller 902 and stores in an internal memory the received screen switching information as sequential logging information. When the monitor 904 cannot receive the screen switching information within a predetermined period of time, the monitor 904 determines that the display controller 902 is in a state of a failure and restarts the display controller 902. And the monitor 904 reads from the internal memory latest screen switching information outputted from the display controller 902, temporarily stores the read latest screen switching information as failure history information in another area of the internal memory, and prepares to transmit the stored failure history information to the displayer controller.

After restart processing has been completed, the display controller 902 transmits to the monitor 904 a signal notifying that a normal operation starts. The monitor 904 determines, by receiving the notifying signal transmitted from the display controller 902, that the display controller 902 starts the normal operation. And the monitor 904 transmits to the display controller 902 the failure history information temporarily stored in the internal memory.

The display controller 902 receives the failure history information transmitted from the monitor 904 and based on the received failure history information, sequentially transmits to the display apparatus 903 contents which had been displayed on the display apparatus 903 when the failure occurred, by using the display contents which had been stored before the failure occurred. The display apparatus 903 displays on the screen the contents transmitted from the display controller 902.

In the conventional failure restoration method, after the failed display controller 902 has been restored, the contents which had been displayed when the failure occurred are displayed on the display apparatus 903.

Patent document 1: Japanese Laid-Open Publication No. 2002-108657 (pages 3-4, FIG. 1)

DISCLOSURE OF THE INVENTION

Problems to be Solved by the Invention

In the display system which realizes the aforementioned conventional failure restoration method, after restarting the display controller, the monitor transmits to the display controller the contents, as the failure history information, which had been displayed when the failure occurred. Based on the failure history information transmitted from the monitor, the display controller redisplays the contents which had been displayed when the failure occurred.

Therefore, during the restart processing of the display controller, it is considered that contents being displayed while restarting the display controller and initial contents to be displayed after having restarted the display controller will be displayed on the screen of the display apparatus. When such contents are displayed from when the failure occurs to when the display controller is restored, confusion caused by unintended change in the displayed contents may arise for a user who refers to the contents on the screen of the display apparatus. It is also likely that operability for a user is impaired by the change in the displayed contents, which a user does not intend.

Therefore, an object of the invention is to provide a controller which is capable of preventing unnecessary contents from being displayed on a screen from when a failure occurs on a terminal apparatus to when the terminal apparatus is restored.

Solution to the Problems

To solve the aforementioned problem, a first aspect of the present invention is directed to a controller for controlling a display on a screen. The controller comprises: at least one display control section for outputting display contents to be displayed on the screen; a display section for updating the display on the screen by displaying on the screen the display contents outputted from the display control section; a failure monitoring section for detecting that a failure has occurred on the display control section, outputting failure detection information, and restarting the display control section; a restoration monitoring section for detecting that the display control section has been restored from the failure and for outputting restoration detection information; and a display update controller for controlling the display section so as to, in response to the failure detection information, suspend updating the display and in response to the restoration detection information, start updating the display.

In such a configuration, updating a display, which is performed by the display section, is suspended in a period from an occurrence of a failure on the display control section to the restoration. Thus, it is prevented that unnecessary display contents are displayed on the screen in a failure restoration process.

In this case, the display control section may output, to the restoration monitoring section, state update information which contains information indicating an internal state, each time the internal state in the display control section changes, and the restoration monitoring section may include a state update information storage section for storing the state update information outputted from the display control section and when latest state update information stored in the state update information storage section before detecting the failure detection information matches with state update information outputted from the display control section after detecting the failure detection information, may detect that the display control section has been restored from the failure.

In such a configuration, when the internal state in the display control section matches with a state immediately before the occurrence of a failure, the display section restarts updating a display, thereby allowing the controller to continue processing starting from a state immediately before the occurrence of a failure.

Further, the internal state contains the display contents.

In such a configuration, when display contents included in the display control section matches with those displayed immediately before the occurrence of a failure, the display section restarts updating a display, thereby allowing the controller to display contents on the screen without interruption between before and after the occurrence of a failure.

And the display control section may output, to the restoration monitoring section, state update information which contains information indicating the internal state, each time the internal state changes, and the restoration monitoring section may detect, when the state update information is outputted from the display control section after detecting the failure detection information, that the display control section has been restored from the failure.

In such a configuration, the restoration monitoring section detects the restoration from a failure when the display control section restarts an operation, thereby allowing the restoration monitoring section to detect in an ensured manner that the display control section has been restored.

And the restoration monitoring section may output restoration interruption information when a predetermined period of time has passed since the failure detection information was detected and the display update control section may control the display section so as to, in response to the outputted restoration interruption information, start updating the display.

In such a configuration, when the restoration monitoring section does not detect restoration from a failure within a predetermined period of time since the failure occurred on the display control section, the display section restarts updating a display. Thus, when the display control section cannot be restored, continuation of a state where updating a display, which is performed by the display section, is suspended can be avoided.

And the failure monitoring section may cause the display control section to terminate if the failure monitoring section detects that a failure has occurred on the display control section in a period from when the display control section is restarted to when the restoration detection information is detected.

In such a configuration, when a failure further occurs during the restoration of the display control section, the failure monitoring section causes the display control section to terminate. Thus, when a failure which cannot be restored through restarting the display control section occurs, a continuous occurrence of a failure on the display control section can be avoided.

The controller may further comprises: an input notification section for outputting an external input as input notification information to the display control section; and an input notification controller for, in response to the outputted failure detection information, suspending outputting the input notification information to the display control section, which is performed by the input notification section and in response to the outputted restoration detection information, starting outputting the input notification information to the display control section, which is performed by the input notification section.

In such a configuration, when a failure occurs on the display control section, the input notification controller suspends outputting to the display section the input notification information which is externally inputted, thereby avoiding an occurrence of a new failure caused by an external input in a failure restoration process.

In this case, the restoration monitoring section, when the input notification information outputted from the input notification section matches with predetermined specific input notification information, may cause the display control section to terminate, thereafter restart the display control section in a manner for coping with the predetermined specific input notification information, and output restoration interruption information; the input notification controller may control the input notification section so as to, in response to the outputted failure detection information, output the input notification information to the restoration monitoring section and in response to the outputted restoration interruption information, output the input notification information to the display control section; and the display update control section may control the display section so as to start updating the display in response to the outputted restoration interruption information.

In such a configuration, when a specific input is generated during the restoration processing of the display control section, the restoration monitoring section interrupts restarting the display control section and starts the display control section in a manner for coping with specific input notification information. Thus, even during the restoration processing of the display control section, the display control section is capable of executing preferentially the processing for coping with a specific external input.

A second aspect of the present invention is directed to a mobile terminal apparatus having a screen. The mobile terminal apparatus comprises: at least one display control section for outputting display contents to be displayed on the screen; a display section for updating the display on the screen by displaying on the screen the display contents outputted from the display control section; a failure monitoring section for detecting that a failure has occurred on the display control section, outputting failure detection information, and restarting the display control section; a restoration monitoring section for detecting that the display control section has been restored from the failure and outputting restoration detection information; and a display update control section for controlling the display section so as to, in response to the failure detection information, suspend updating the display and in response to the restoration detection information, start updating the display.

In such a configuration, updating a display, which is performed by the display section, is suspended in a period from an occurrence of a failure on the display control section to the restoration. Thus, it is prevented that unnecessary display contents are displayed on the screen of the mobile terminal apparatus in a failure restoration process.

A third aspect of the present invention is directed to a mobile terminal apparatus for controlling a display on an external screen. The mobile terminal apparatus comprises: at least one display control section for outputting display contents to be displayed on the screen; a display section for updating the display on the screen by displaying on the screen the display contents outputted from the display control section; a failure monitoring section for detecting that a failure has occurred on the display control section, outputting failure detection information, and restarting the display control section; a restoration monitoring section for detecting that the display control section has been restored from the failure and outputting restoration detection information; and a display update control section for controlling the display section so as to, in response to the failure detection information, suspend updating the display and in response to the restoration detection information, start updating the display.

In such a configuration, updating a display, which is performed by the display section, is suspended in a period from an occurrence of a failure on the display control section to the restoration. Thus, it is prevented that unnecessary display contents are displayed on the external screen in a failure restoration process.

A fourth aspect of the present invention is directed to a program for causing a terminal apparatus having a screen to operate. The program causes the terminal apparatus to function as: at least one display control means for outputting display contents to be displayed on the screen; display means for updating the display on the screen by displaying on the screen the display contents outputted from the display control section; failure monitoring means for detecting that a failure has occurred on the display control section, outputting failure detection information, and restarting the display control section; restoration monitoring means for detecting that the display control section has been restored from the failure and outputting restoration detection information; and display update control means for controlling the display section so as to, in response to the failure detection information, suspend updating the display and in response to the restoration detection information, start updating the display.

In such a configuration, updating a display, which is performed by the display section, is suspended in a period from an occurrence of a failure on the display control section to the restoration. Thus, it is prevented that unnecessary display contents are displayed on the screen in a failure restoration process.

A fifth aspect of the present invention is directed to an integrated circuit for controlling a display on a screen. Integrated in the integrated circuit are circuits functioning as: at least one display control section for outputting display contents to be displayed on the screen; a display section for updating the display on the screen by displaying on the screen the display contents outputted from the display control section; a failure monitoring section for detecting that a failure has occurred on the display control section, outputting failure detection information, and restarting the display control section; a restoration monitoring section for detecting that the display control section has been restored from the failure and outputting restoration detection information; and a display update control section for controlling the display section so as to, in response to the failure detection information, suspend updating the display and in response to the restoration detection information, start updating the display.

In such a configuration, updating a display, which is performed by the display section, is suspended in a period from an occurrence of a failure on the display control section to the restoration. Thus, it is prevented that unnecessary display contents are displayed on the screen in a failure restoration process.

EFFECT OF THE INVENTION

In a controller according to the present invention, it can be prevented that an unnecessary screen is displayed during the failure restoration, allowing an operability of a terminal apparatus to be enhanced. And through preventing an occurrence of a new failure caused by a user's input, a failure can be restored in an ensured manner without being influenced by the user's input during the failure restoration.

A mobile terminal apparatus according to the present invention is capable of preventing an unnecessary screen display upon the failure restoration and enhancing an operability of the mobile terminal apparatus.

A program and an integrated circuit are capable of preventing an unnecessary screen display upon the failure restoration and enhancing an operability of the mobile terminal apparatus.

DESCRIPTION OF THE REFERENCE CHARACTERS

Figure 1:
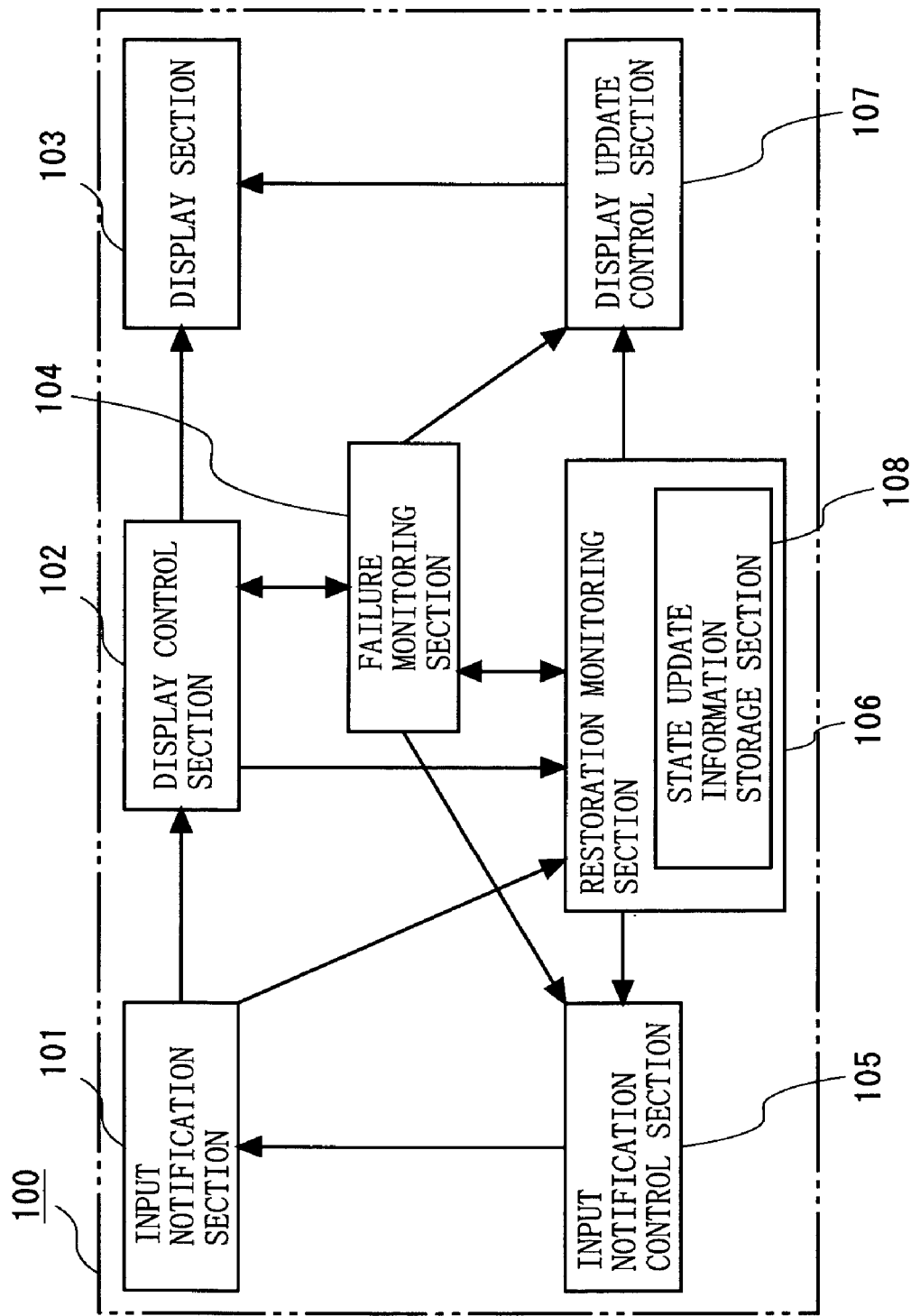
FIG. 1 is a schematic block diagram illustrating a configuration of a controller according to a first embodiment of the present invention.

100 controller
101 input notification section
102 display control section
103 display section
104 failure monitoring section
105 input notification control section
106 restoration monitoring section 107 display update control section 108 state update information storage section

BEST MODE FOR CARRYING OUT THE INVENTION

First Embodiment

FIG. 1 is a schematic block diagram illustrating a configuration of a controller according to a first embodiment of the present invention. The controller 100 shown in FIG. 1 comprises an input notification section 101, a display control section 102, a display section 103, a failure monitoring section 104, an input notification control section 105, a restoration monitoring section 106, and a display update control section 107. The controller 100 according to the first embodiment is an apparatus for controlling a display on a screen in a terminal apparatus having a screen, such as a mobile telephone, a PDA, a digital camera, and an in-vehicle apparatus.

The display control section 102 outputs to the display section 103 contents to be displayed on a display section of a terminal apparatus (not shown). Each time an internal state of the display control section 102 changes, the display control section 102 outputs to the restoration monitoring section 106 state update information containing information which indicates an internal state. The internal state of the display control section 102 refers to a state of data and parameters which the display control section 102 holds, such as a state in which the display control section 102 is waiting for processing, a state in which the display control section 102 is processing data, and a state in which the display control section 102 is transmitting data. In particular, in the first embodiment, the internal state contains display contents which are outputted to the display section 103.

The display section 103 updates a display of the contents by displaying the contents, outputted from the display control section 102, on a screen (not shown) such as an LCD and a CRT. And the display section 103 suspends updating the display of the contents in accordance with an instruction from the display update control section 107 described below.

The failure monitoring section 104 monitors operations of the display control section 102 and detects that a failure occurs on the display control section 102. When the failure monitoring section 104 detects a failure occurring on the display control section 102, the failure monitoring section 104 notifies the input notification control section 105, the restoration monitoring section 106, and the display update control section 107 that the failure has occurred. Specifically, the failure monitoring section 104 outputs failure detection information containing, for example, signals, data, and the like. And in order to restore the display control section 102 from the failure, the failure monitoring section 104 restarts the display control section 102.

Detecting a failure on the display control section 102 by using the failure monitoring section 104 can be realized by various methods. For example, the failure monitoring section 104 checks periodically at predetermined time intervals that the display control section 102 transmits to the display section 103 contents to be displayed in a normal manner and when the display control section 102 does not transmit the contents to be displayed within the predetermined time intervals, determines that a failure has occurred on the display control section 102. And when the failure has occurred on the display control section 102, the display control section 102 may output information indicating that the failure occurs and the failure monitoring section 104 may detect, based on the information outputted by the display control section 102, that the failure has occurred.

Furthermore, from when the failure monitoring section 104 detects that the failure has occurred on the display control section 102 to when the failure monitoring section 104 detects, based on an output from the restoration monitoring section 106, that the display control section 102 is restored from the failure, in a case where the failure monitoring section 104 detects that a failure has occurred again on the display control section 102 and in a case where the failure monitoring section 104 detects, based on the output from the restoration monitoring section 106, that the restoration of the display control section 102 is interrupted, the failure monitoring section 104 suspends restarting the display control section 102 in accordance with an instruction from the restoration monitoring section 106 and causes the display control section 102 to terminate. Also in this case, in order to detect a failure, for example, any of the aforementioned methods of detecting a failure can be adopted. And after causing the display control section 102 to terminate, the failure monitoring section 104 outputs restoration interruption information to the input notification control section 105 and the display update control section 107. As a cause of such a case, for example, a breakdown of the display control section 102 itself is considered.

The restoration monitoring section 106 detects that the display control section 102 is restored from a failure. When the restoration monitoring section 106 detects that the display control section 102 is restored from the failure, the restoration monitoring section 106 notifies the input notification control section 105, the failure monitoring section 104, and the display update control section 107 that the display control section 102 is restored from the failure. Specifically, the restoration monitoring section 106 outputs restoration detection information containing, for example, signals, data, and the like. The restoration monitoring section 106 includes a state update information storage section 108 which stores the state update information outputted from the display control section 102.

Detecting restoration of the display control section 102 by using the restoration monitoring section 106 can be realized by various methods. For example, the restoration monitoring section 106 compares a piece of state update information, which is outputted from the display control section 102 immediately before a failure occurs, with a piece of state update information, which is notified first after the failure occurred. And when these pieces of the state update information match, it is determined that the display control section 102 has been restored from a failure. More specifically, the restoration monitoring section 106 reads out, from the state update information storage section 108, a piece of state update information, which is outputted from the display control section 102 last before detecting failure detection information outputted from the failure monitoring section 104. Next, the restoration monitoring section 106 compares the read-out piece of the state update information with a piece of the state update information, which is outputted from the display control section 102 first after detecting the failure detection information outputted from the failure monitoring section 104. When these pieces of the state update information match, it is determined that the display control section 102 has been restored from a failure.

And as another method, when the restoration monitoring section 106 detects state update information, which is outputted from the display control section 102 first after detecting failure detection information outputted from the failure monitoring section 104, it may be determined that the display control section 102 has been restored from a failure.

The restoration monitoring section 106 may use both of the aforementioned two methods. In this case, which one of the two methods to be used may be previously determined when a system is designed or switching between the two methods may be made depending on a kind of the display control section 102, contents displayed upon an occurrence of a failure or the like. A method, other than the aforementioned two methods, which allows the restoration monitoring section 106 to determine that the display control section 102 has been restored from a failure may be employed.

When a given period of time has passed after a failure occurred on the display control section 102 or when specific input notification information which notifies that restoration processing for the display control section 102 should be interrupted is outputted from the input notification section 101, the restoration monitoring section 106 notifies the failure monitoring section 104 that restoration is interrupted. More specifically, the restoration monitoring section 106 outputs restoration interruption information containing, for example, signals and data. The specific input notification information refers to, for example, an input to a terminal apparatus through pressing a forced termination key; a telephone call reception and a mail reception particularly in a case where a terminal apparatus is a mobile telephone; a notification that a battery power of a terminal apparatus is reduced; and information containing signals and data or the like to notify specific inputs for processing using an alarm function or a scheduler.

The display update control section 107, in response to the failure detection information outputted from the failure monitoring section 104, suspends updating a display, which is performed by the display section 103, and starts, in response to the restoration detection information outputted from the restoration monitoring section 106, updating a display, which is performed by the display section 103.

The input notification section 101 outputs, as input notification information, to the display control section 102 an input from keys, a mouse, a communications apparatus or the like. The input notification section 101, in accordance with an instruction from the input notification control section 105 described below, suspends outputting the input notification information to the display control section 102. In the first embodiment, the input notification section 101 notifies the restoration monitoring section 106 of the input notification information while suspending outputting the input notification information to the display control section 102.

The input notification control section 105, in response to the failure detection information outputted from the failure monitoring section 104, suspends transmitting the input notification information to the display control section 102, which is performed by the input notification section 101. The input notification control section 105, in response to the restoration detection information outputted from the restoration monitoring section 106, starts transmitting the input notification information to the display control section 102, which is performed by the input notification section.

Figure 2A:
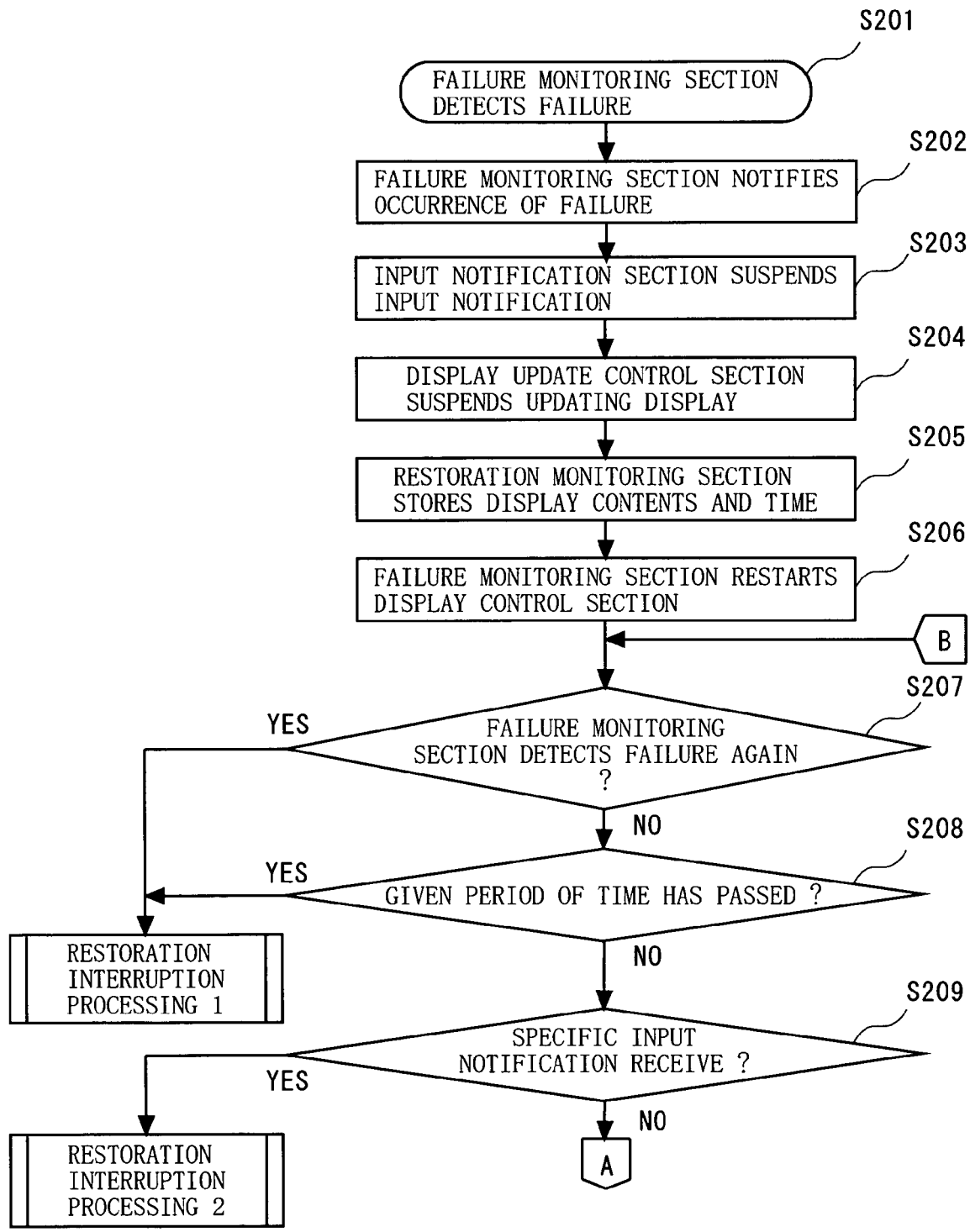
FIG. 2A is a flowchart showing failure restoration processing executed by the controller according to the first embodiment of the present invention.
Figure 2B:
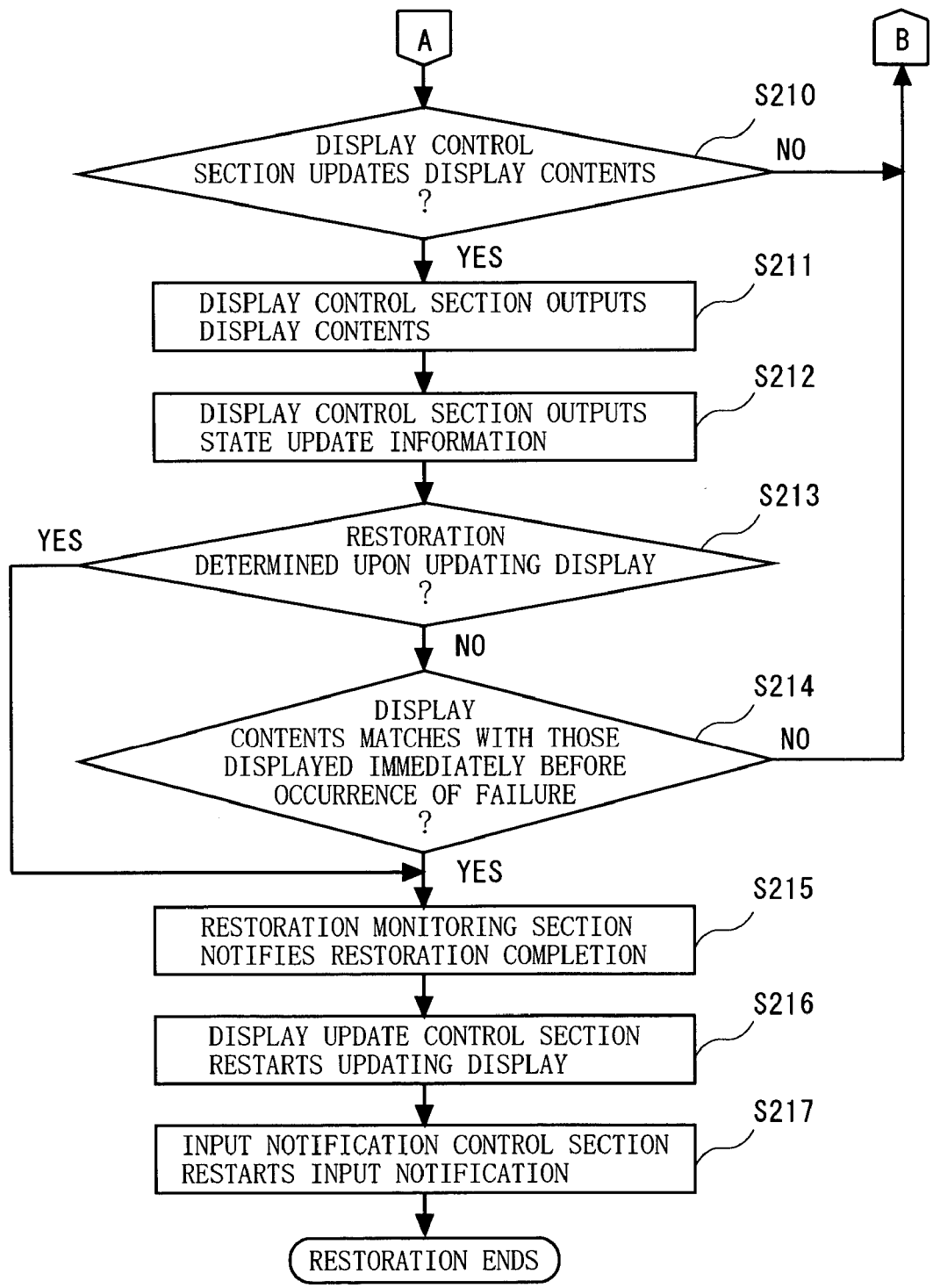
FIG. 2B is a flowchart showing failure restoration processing which follows the failure restoration processing shown in FIG. 2A.

FIG. 2A is a flowchart showing failure restoration processing executed by the controller according to the first embodiment of the present invention. FIG. 2B is a flowchart showing failure restoration processing which follows the failure restoration processing shown in FIG. 2A.

In FIG. 2A and FIG. 1, the failure monitoring section 104 detects that a failure has occurred on the display control section 102 (step S201). Next, the failure monitoring section 104 notifies that the failure has occurred on the display control section 102 (step S202). At this time, the failure monitoring section 104 outputs the failure detection information to the input notification control section 105, the restoration monitoring section 106, and the display update control section 107.

The input notification control section 105, in response to the failure detection information outputted from the failure monitoring section 104, suspends outputting the input notification information from the input notification section 101 to the display control section 102 (step S203). And the display update control section 107, in response to the failure detection information outputted from the failure monitoring section 104, suspends updating a display, which is performed by the display section 103 (step S204). Further, the restoration monitoring section 106 stores current time and state update information outputted from the display control section 102 immediately before detecting the failure detection information (step S205).

Next, the failure monitoring section 104 restarts the display control section 102 (step S206).

Next, the failure monitoring section 104 determines whether a failure is detected again on the display control section 102 (step S207). When the failure monitoring section 104 detects that the failure has occurred again on the display control section 102 (YES at step S207), the controller 100 executes restoration interruption processing 1 described below. On the other hand, when the controller 100 does not detect that the failure has occurred on the display control section 102 (NO at step S207), the controller 100 executes processing at step S208.

Next, the restoration monitoring section 106 determines whether or not a given period of time has passed since a failure occurred on the display control section 102. More specifically, the restoration monitoring section 106 determines whether a given period of time has passed between the time which the restoration monitoring section 106 stored at step S205 and current time. When a given period of time has passed between the time when a failure occurred and the current time (YES at step S208), the controller 100 executes the restoration interruption processing 1 described below. On the other hand, when a given period of time has not passed between the time when a failure occurred and the current time (NO at step S208), the controller executes processing at step S209.

Next, the restoration monitoring section 106 determines whether or not specific input notification information is received from the input notification section 101 (step S209). More specifically, the restoration monitoring section 106 determines in a sequential manner whether a plurality of pieces of the input notification information which are outputted from the input notification section 101 are predetermined specific pieces of the input notification information. When the restoration monitoring section 106 receives a specific piece of input notification information from the input notification section 101 (YES at step S209), in order to cope with a specific notification of an input such as a telephone call reception, the controller 100 executes restoration interruption processing 2 described below. On the other hand, when the restoration monitoring section 106 does not receive a specific piece of input notification information from the input notification section 101 (NO at step S209), the controller 100 executes processing which follows a connector A.

Subsequently, in FIG. 2B and FIG. 1, the restoration monitoring section 106 determines whether or not the display control section 102 updates display contents (step S210). More specifically, when the restoration monitoring section 106 receives the state update information from the display control section 102 after detecting the failure detection information outputted from the failure monitoring section 104, the restoration monitoring 106 determines that the display control section 102 has updated the display contents. When the display control section 102 has updated the display contents (YES at step S210), the display control section 102 outputs the display contents to the display section 103 (step S211) and outputs the state update information to the failure monitoring section 104 (step S212). Thereafter, the controller 100 executes successive processing at step S213. On the other hand, when the display control section 102 has not updated the display contents (NO at step S210), the controller 100 returns from a connector B to step S205 in FIG. 2A and repeats the aforementioned processing.

Here, the controller 100 performs processing in accordance with a restoration determination method which is set in order for the restoration monitoring section 106 to determine restoration. If a method in which the restoration monitoring section 106 determines the restoration when a display is updated by the display control section 102 is set (YES at step S213), the controller 100 executes processing at step S214. In the controller 100 in which such a restoration detection method is employed, since the restoration monitoring section 106 detects the restoration from a failure when the display control section 102 restarts an operation, the restoration monitoring section 106 is capable of detecting in an ensured manner that the display control section 102 has been restored.

Alternatively, when the method in which the restoration monitoring section 106 determines restoration when a display is updated by the display control section 102 is not set (NO at step S213), the restoration monitoring section 106 determines whether or not display contents match contents displayed immediately before a failure occurs (step S214). More specifically, the restoration monitoring section 106 determines whether or not display contents contained in the latest state update information, immediately before an occurrence of a failure, which is stored in the state update information storage section 108 matches with display contents contained in the state update information which is received from the display control section 102 at step S212. When the display contents matches with contents displayed immediately before the occurrence of a failure (YES at step S214), the controller 100 executes processing at step S215. When the display contents do not match with contents displayed immediately before the occurrence of a failure (NO at step S214), the controller 100 returns from a connector B to step S207 in FIG. 2A and repeats the aforementioned processing.

After detecting the restoration from a failure, the restoration monitoring section 106 notifies the display update control section 107 and the input notification control section 105 that the restoration is completed (step S215). At this time, the restoration monitoring section 106 outputs the restoration detection information to the display update control section 107 and the input notification control section 105.

And the display update control section 107 restarts updating a display (step S216). More specifically, the display update control section 107, in response to the restoration detection information outputted from the restoration monitoring section 106, controls the display section 103 so as to start updating a display.

And the input notification control section 105 restarts an input notification (step S217). More specifically, the input notification control section 105, in response to the restoration detection information outputted from the restoration monitoring section 106, controls the input notification section 101 so as to output the input notification information to the display control section 102.

Through performing the aforementioned control processing, the controller 100 completes the restoration from a failure occurring on the display control section 102.

Figure 3:
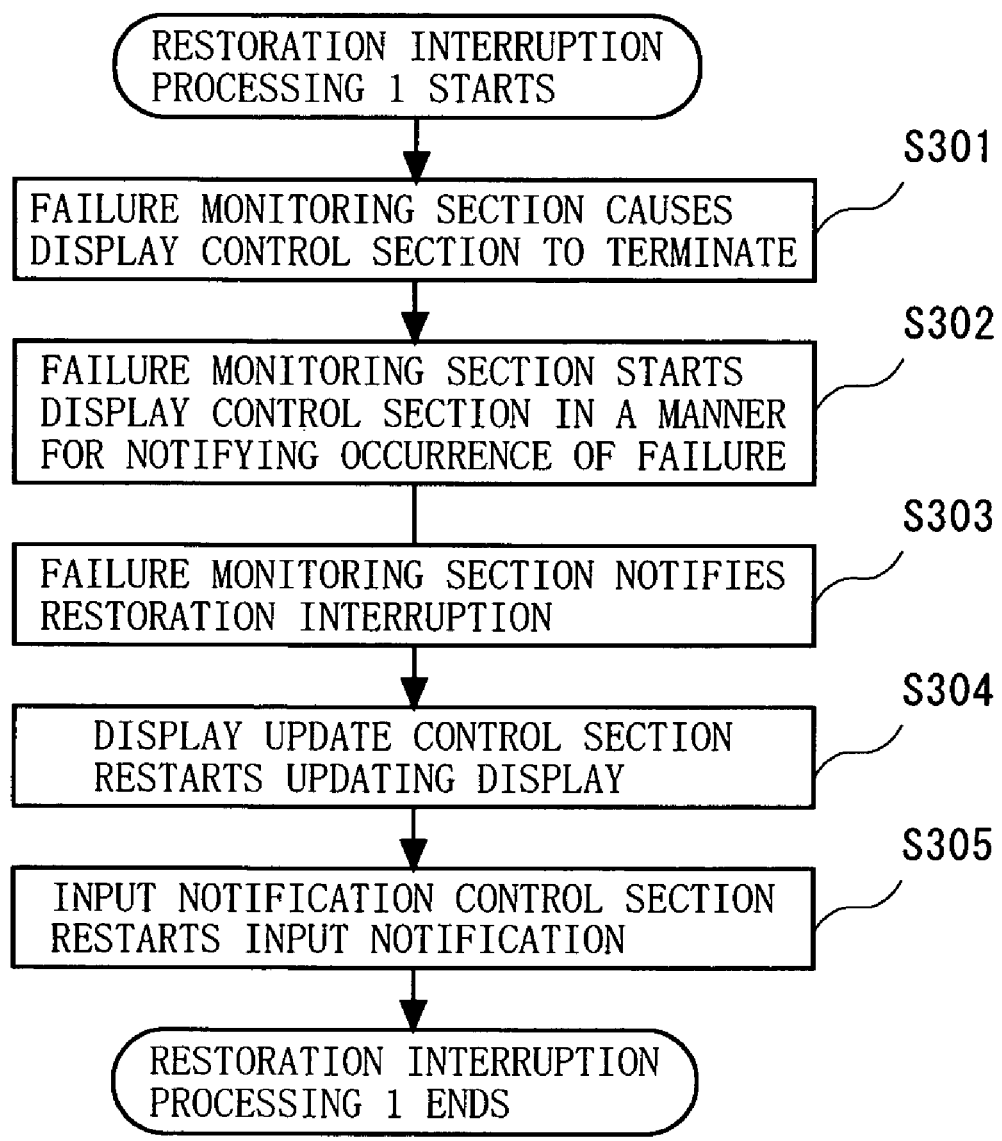
FIG. 3 is a flowchart showing details of the restoration interruption processing 1 shown in FIG. 2A.

FIG. 3 is a flowchart showing details of the restoration interruption processing 1 shown in FIG. 2A. With reference to FIG. 3, a flow of the restoration interruption processing 1 in a case where the failure monitoring section 104 detects, while restoring the display control section 102 from a failure, that a failure is detected again (YES at step S207 in FIG. 2A) and a case where the restoration from a failure is not completed after a given period of time has passed since the failure monitoring section 104 restarted the display control section 102 (YES at step 208 in FIG. 2A) will be described.

First, the failure monitoring section 104 causes the display control section 102 to terminate (step S301). Next, the failure monitoring section 104 starts the display control section 102 in a manner for notifying an occurrence of a failure (step 5302). In the first embodiment, in order to display a screen for notifying a user that a failure has occurred, the failure monitoring section 104, specifying a starting method for notifying the occurrence of a failure, starts the display control section 102. As a manner for notifying the occurrence of a failure, instead of specifying a starting method, it is considered that a display control section dedicated to notifying a failure is separately provided and the display control section is started. Also through starting such a display control section dedicated to notifying a failure, notifying a user that a failure has occurred is enabled.

The failure monitoring section 104 notifies the display update control section 107 and the input notification control section 105 that the restoration of the display control section 102 is interrupted (step S303). Specifically, the failure monitoring section 104 outputs the restoration interruption information to the display update control section 107 and the input notification control section 105.

Next, the display update control section 107, in response to the restoration interruption information outputted from the failure monitoring section 104, restarts updating a display, which is performed by the display section 103 (step S304). And the input notification control section 105, in response to the restoration interruption information outputted from the failure monitoring section 104, restarts notifying an input, which is performed by the input notification section 101 (step S305).

Through the aforementioned control processing, the controller 100 completes the failure restoration processing 1.

In the restoration interruption processing 1 according to the first embodiment, if the occurrence of a failure is not notified to a user, processing at step S302 may be omitted.

Figure 4:
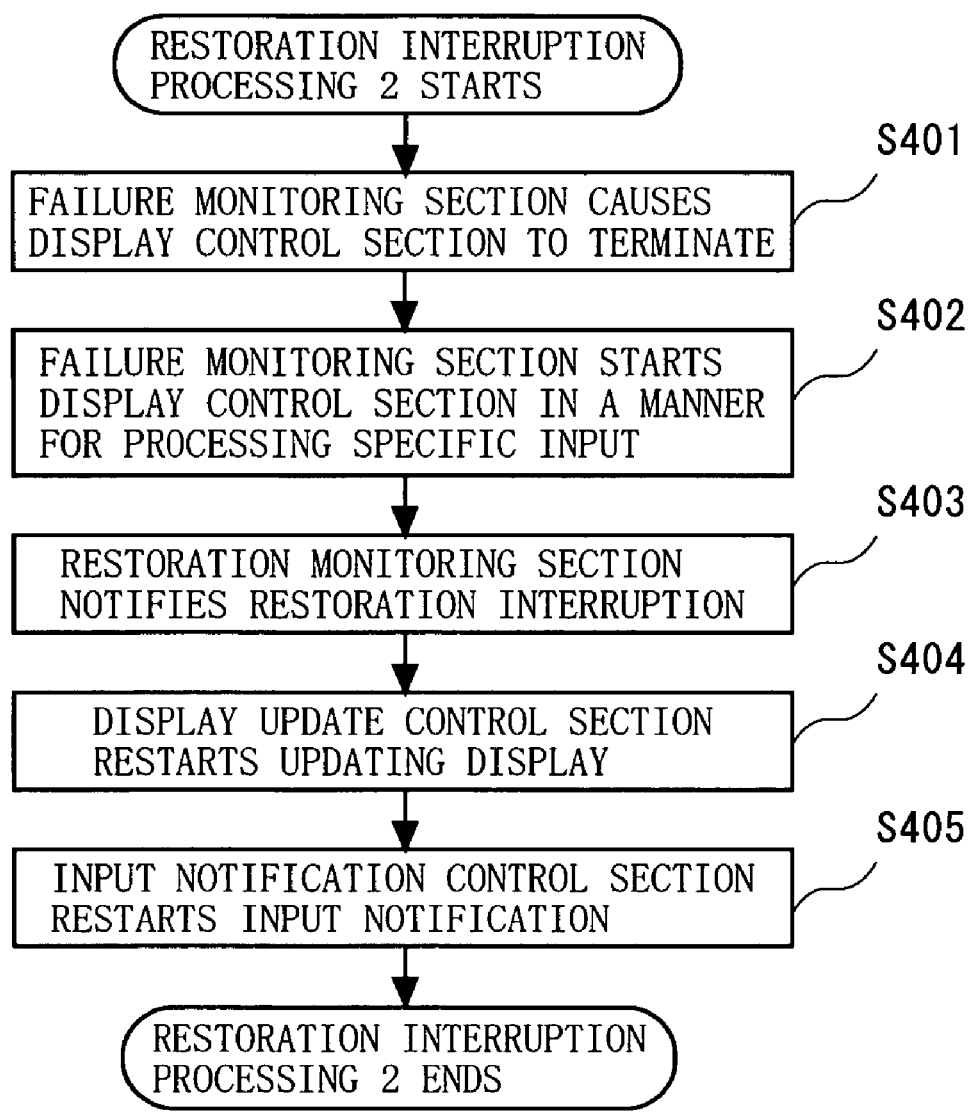
FIG. 4 is a flowchart showing details of restoration interruption processing 2 shown in FIG. 2A.

FIG. 4 is a flowchart showing details of restoration interruption processing 2 shown in FIG. 2A. With reference to FIG. 4, the restoration interruption processing 2 in a case where a specific external input is generated while restoring the display control section 102 from a failure (YES at step S209 in FIG. 2A) will be described. The specific external input refers to pressing a forced termination key of a terminal apparatus, a data reception such as a telephone call reception or the like.

First, the failure monitoring section 104 causes the display control section 102 to terminate (step S401). Next, the failure monitoring section 104 starts the display control section 102 in a manner for processing a specific input (step S402). In the first embodiment, the failure monitoring section 104, specifying a starting method for processing a specific input, starts the display control section 102. In a more specific example, if the restoration monitoring section 106 receives input processing information for notifying a telephone call reception, the failure monitoring section 104, specifying a starting method for displaying a telephone call reception screen, starts the display control section 102. In another specific example, if a notification of a forced termination is received, the failure monitoring section 104, specifying a starting method for displaying a termination screen, starts the display control section.

As a manner for processing a specific input, instead of specifying a starting method of the display control section 102 for processing specific input notification information, it is considered that a display control section for coping with the specific input notification information is separately provided and the display control section is started. For example, a display control section dedicated to processing a telephone call reception may be separately provided and through starting the dedicated display control section in response to input notification information for notifying a telephone call reception, a telephone call reception screen may be displayed. And a display control section for displaying a termination screen is separately provided and through starting the display control section in response to input notification information for instructing a forced termination, a termination screen may be displayed.

And the failure monitoring section 104 notifies the display update control section 107 and the input notification control section 105 that restoration of the display control section 102 has been interrupted (step S403). Specifically, the failure monitoring section 104 outputs the restoration interruption information to the display update control section 107 and the input notification control section 105.

Next, the display update control section 107, in response to the restoration interruption information outputted from the failure monitoring section 104, restarts updating a display, which is performed by the display section 103 (step S404). And the input notification control section 105, in response to the restoration interruption information outputted from the failure monitoring section 104, restarts notifying an input, which is performed by the input notification section 101 (step S405).

Through performing the aforementioned control processing, the controller 100 completes the failure interruption processing 2.

If in the restoration interruption processing 2, a termination screen is not displayed when input notification information which instructs a forced termination is received, the processing at the step S402 may be omitted.

Here, effect which is obtained by the controller according to the first embodiment, being compared with effect which is obtained by a conventional apparatus, will be described. FIGS. 5 to 8 described below show views of a screen of, for example, a mobile telephone, whose state changes from A through D in order. In FIGS. 5 to 8, A shows a state of the screen appearing immediately before a failure occurs on the display control section; B shows a state of the screen appearing immediately after the display control section has been restored from a failure; C shows a state of the screen appearing while restoring the display control section; and D shows a state of the screen appearing when restoration processing for the display control section is completed or interrupted.

Figure 5:
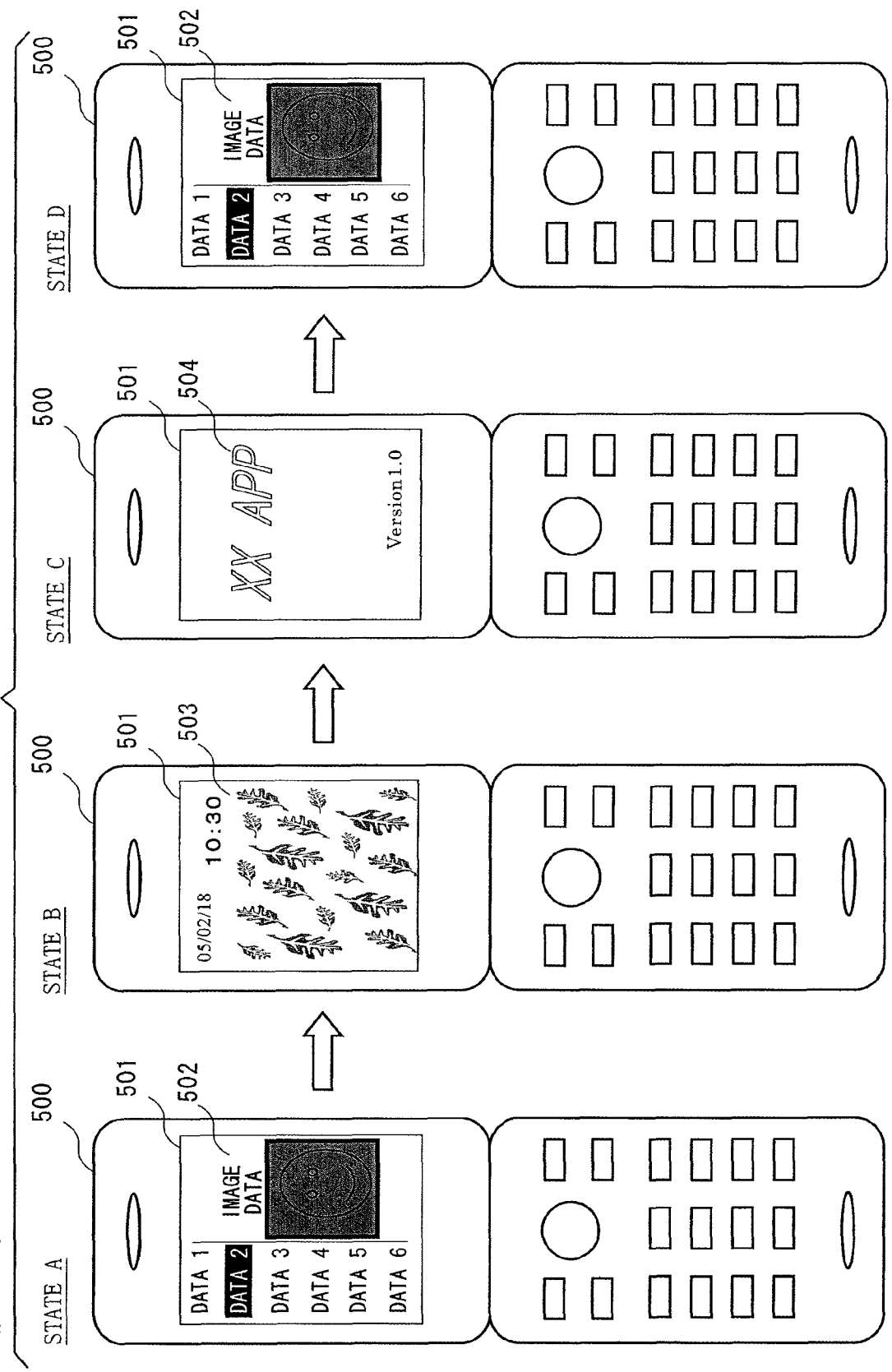
FIG. 5 is a transition diagram illustrating views of a screen displayed by a conventional apparatus, which realizes a conventional failure restoration method, during the failure restoration processing.

FIG. 5 is a transition diagram illustrating views of a screen displayed while restoring the conventional apparatus, from a failure, which realizes a conventional failure restoration method.

In a state A, display contents 502 are displayed on a screen 501 of a terminal apparatus 500, which is, for example, a mobile telephone. When a failure monitoring section detects that a failure has occurred on a display control section, the failure monitoring section restarts the display control section in order to restore the display control section from a failure.

At this time, a screen of an application or the like, which is being executed in a background, is displayed on the screen 501 as shown in a state B. Next, when restarting the display control section proceeds, a start screen of the display control section is displayed on the screen 501 as shown in a state C.

After restoring the display control section from a failure is completed through restarting the display control section, display contents 502, which were displayed immediately before a failure occurred, are displayed on the screen 501.

In a terminal apparatus employing a mechanism in which a plurality of display control sections share one display section, which is, for example, typified by a window system, the following problem may arise.

As shown in the state B and the state C in FIG. 5, during the failure restoration processing for the display control section which was displaying the display contents 502, display contents 503 of another display control section which is performing an execution in a background and a start screen 504 of the display control section are displayed on the screen 501. As a result, a change in the displayed contents which a user using the terminal apparatus 500 does not intend may confuse the user or impair operability for the user.

Resulting from an external input which is caused by the user's pressing of an operation key while restoring the display control section from a failure, another display control section which is performing an execution in a background may malfunction.

Further, if the user's input such as a key operation is generated while restoring the display control section from a failure, the display control section being restarted is going to execute processing in accordance with the user's input and thereby inconsistency on the display control section may occur as compared with a state before an occurrence of a failure on the display control section. Thus, an unexpected failure may be newly generated.

On the contrary, in the controller according to the first embodiment, a screen of the terminal apparatus changes as follows.

Figure 6:
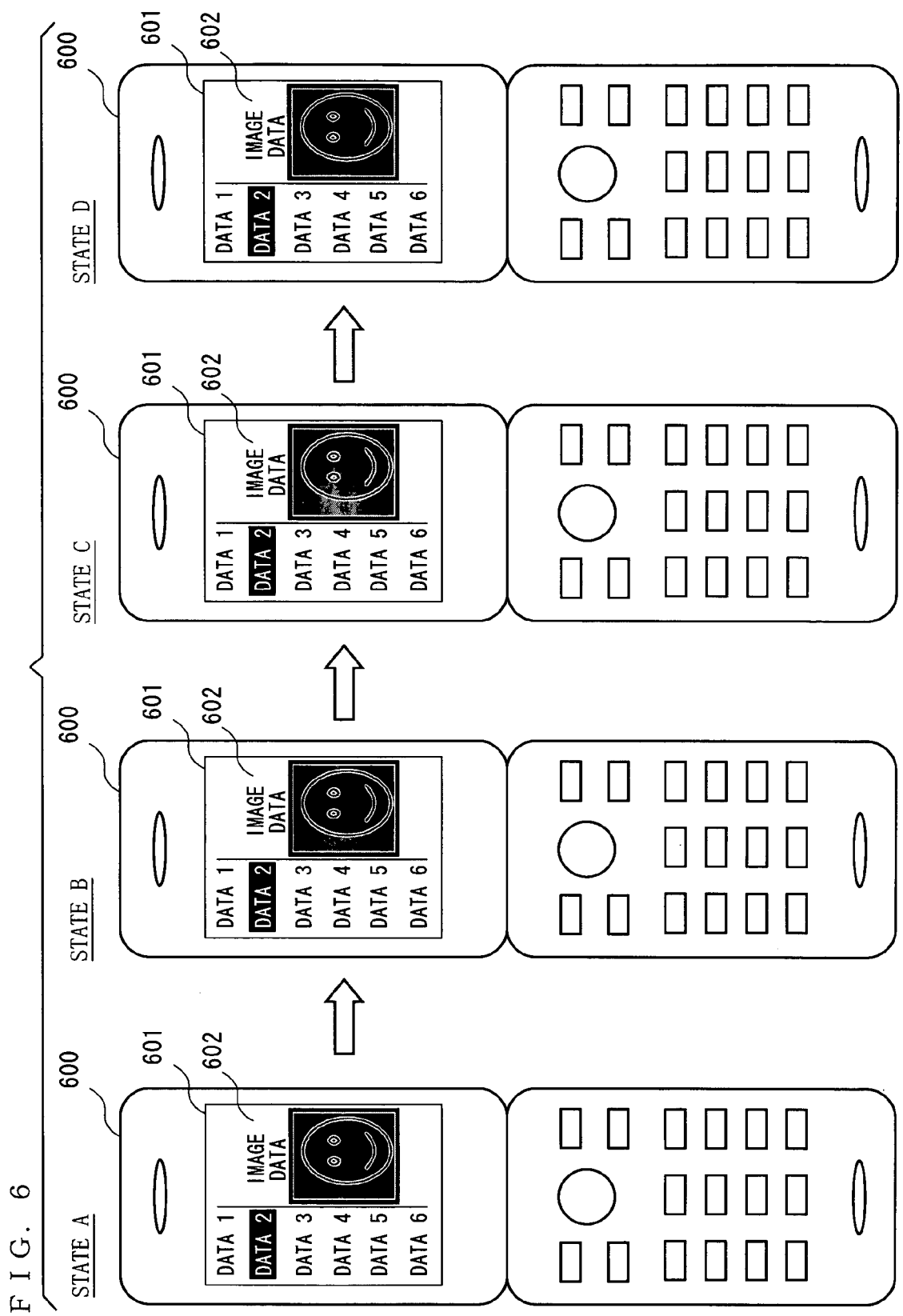
FIG. 6 is a transition diagram illustrating views of a screen displayed by the controller according to the first embodiment of the present invention during the failure restoration processing.

FIG. 6 is a transition diagram illustrating views of a screen displayed by the controller according to the first embodiment of the present invention during the failure restoration processing.

In a state A, display contents 602 are displayed on a screen 601 in a terminal apparatus 600 including the controller according to the first embodiment. As described above, when the failure monitoring section detects a failure occurring on the display control section, the failure monitoring section restarts the display control section and concurrently outputs the failure detection information to the display control section and the input notification control section. The display control section, in response to the outputted failure detection information, suspends updating a display, which is performed by the display section.

As a result of suspending updating the display, which is performed by the display section, as shown in a state B and a state C, the display contents 602 are continuously displayed on the screen 601, as similar to those displayed immediately before a failure occurred on the display control section.

And after the failure restoration on the display control section is completed through, as shown in a state D, the display contents 602 which were displayed immediately before the failure occurred are displayed on the screen 601.

As described above, in the controller according to the first embodiment, since updating a display, which is performed by the display section, is suspended from an occurrence of a failure on the display control section until the restoration, it is prevented that unnecessary display contents are displayed on the screen during the failure restoration processing.

In addition, when display contents included in the display control section matches with those displayed immediately before the occurrence of a failure, the display section restarts updating a display, thereby allowing the controller to display contents on the screen without interruption between before and after the occurrence of a failure.

Further, the input notification control section, in response to the outputted failure detection information, suspends outputting the input notification information to the display control section, which is performed by the input notification section. Thus, even if an external input is generated by a user's pressing of an operation key, the input notification information is not outputted to the display control section, thereby avoiding an occurrence of a new failure generated on the display control section being restarted and on a display control section being operated in a background.

Figure 7:
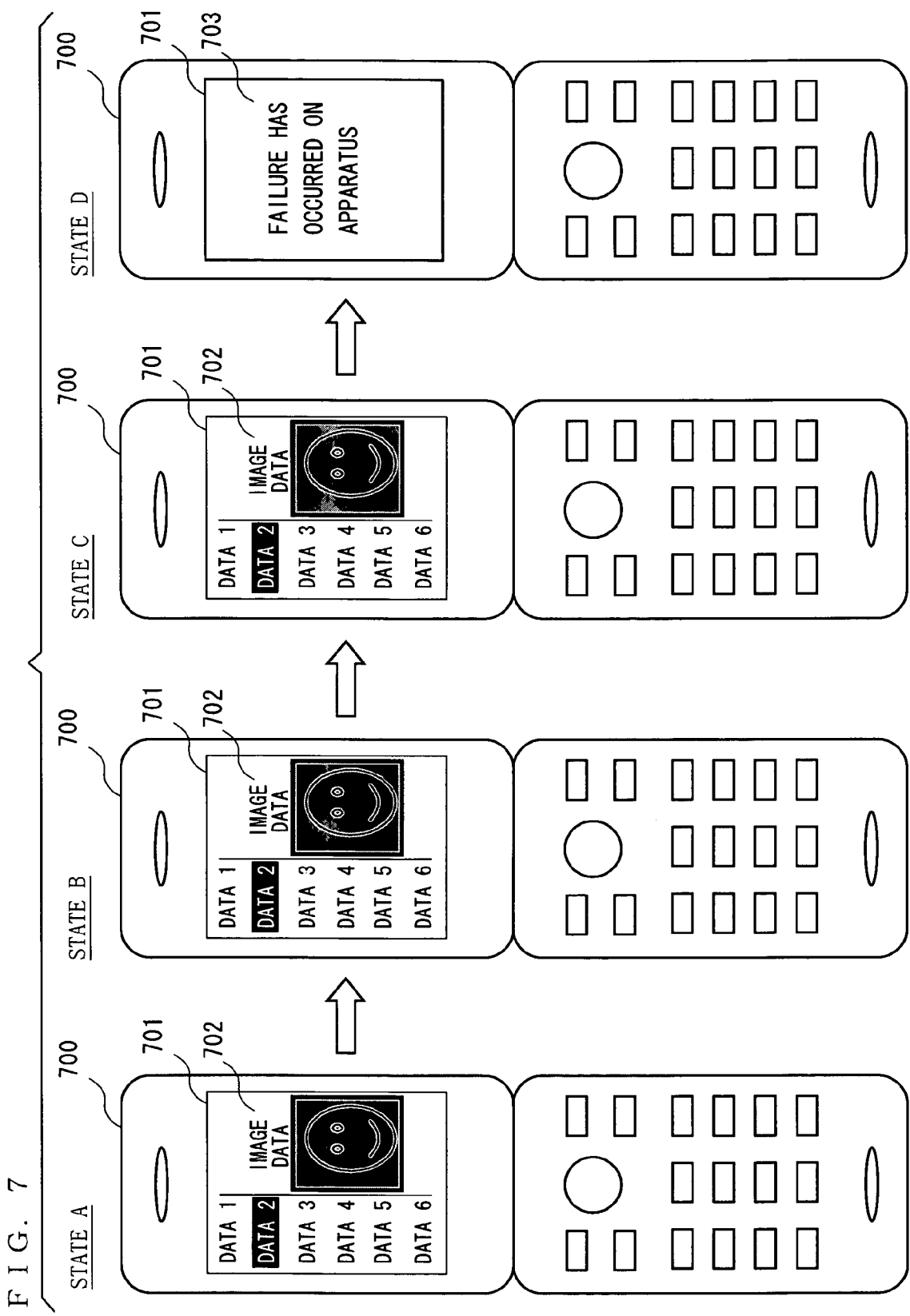
FIG. 7 is a transition diagram illustrating views of a screen displayed by the controller according to the first embodiment of the present invention in a case where a failure occurs again during the failure restoration processing.

FIG. 7 is a transition diagram illustrating views of a screen displayed by the controller according to the first embodiment of the present invention in a case where a failure occurs again during the failure restoration processing.

As shown in states A, B, and C in FIG. 7, display contents 702 displayed immediately before a failure occurred on the display control section are continuously displayed on a screen 701 in a terminal apparatus 700 including the controller according to the first embodiment.

Here, suppose a case where a failure occurs again on the display control section, immediately after the state C, i.e., before restoration of the display control section is completed. In this case, as described above, the controller of the first embodiment executes the restoration interruption processing 1 shown in FIG. 3. In the restoration interruption processing 1, when the failure monitoring section detects that a failure occurred again, after causing the display control section being restarted to terminate, the failure monitoring section starts the display control section in a manner for notifying that a failure occurred on an apparatus.

As a result, a screen for notifying a user of a failure, as shown in a state D, is displayed on the screen 701.

As described above, in the controller according to the first embodiment, when the restoration monitoring section does not detect restoration from a failure within a predetermined period of time since the failure occurred on the display control section, the display section restarts updating a display. Thus, when the display control section cannot be restored, continuation of a state where updating a display, which is performed by the display section, is suspended can be avoided.

In addition, when a failure further occurs during the restoration of the display control section, the failure monitoring section causes the display control section to terminate. Thus, when a failure which cannot be restored through restarting the display control section occurs, a continuous occurrence of a failure on the display control section can be avoided.

Figure 8:
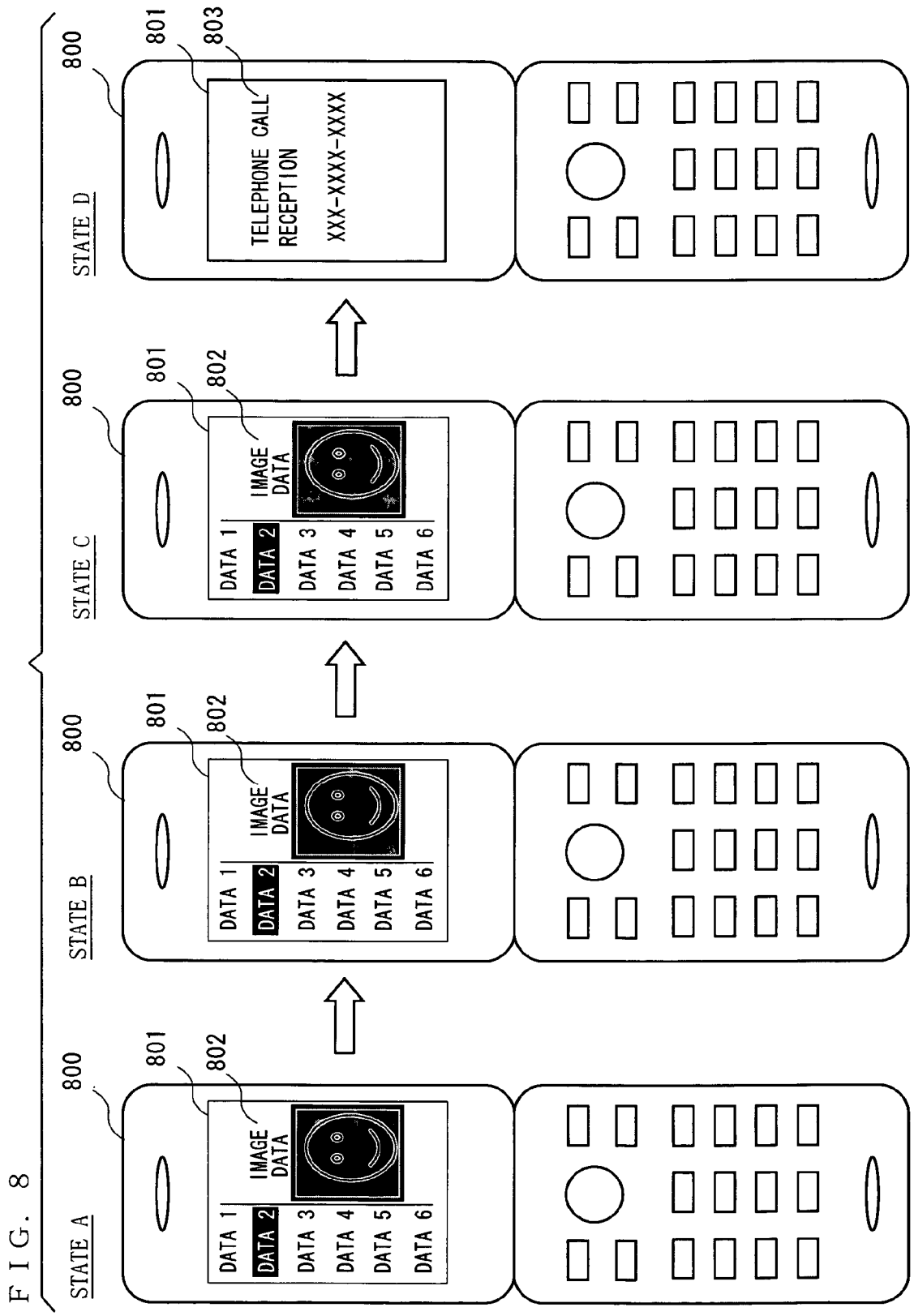
FIG. 8 is a transition diagram illustrating views of a screen displayed by the controller according to the first embodiment of the present invention in a case where a specific input occurs.
Figure 9:
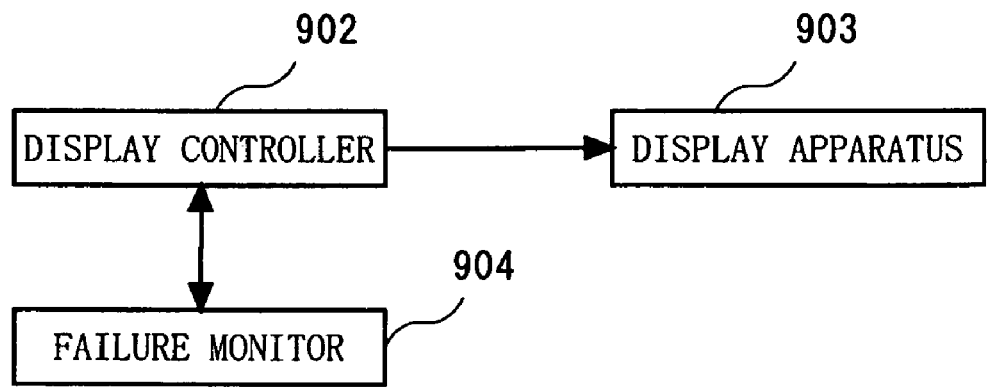
FIG. 9 is a block diagram showing main parts of a display system which realizes a conventional failure restoration method.

FIG. 8 is a transition diagram illustrating views of a screen displayed by the controller according to the first embodiment of the present invention in a case where a specific input is generated.

As shown in states A to C in FIG. 8, display contents 802 displayed immediately before a failure occurred on the display control section are continuously displayed on a screen 801 in a terminal apparatus 800.

Here, suppose a case where a telephone call reception, as the specific input, occurs, immediately after the state C, i.e., before restoration of the display control section is completed. In this case, as described above, the controller of the first embodiment executes the restoration interruption processing 2 shown in FIG. 4. In the restoration interruption processing 2, when the failure monitoring section receives input notification information indicating the telephone call reception, after causing the display control section being restarted to terminate, the failure monitoring section starts the display control section in a manner for processing the telephone call reception.

As a result, a screen for notifying a user of the telephone call reception, as shown in a state D, is displayed on a screen 804.

As described above, in the controller according to the first embodiment, when a specific input is generated during the restoration processing of the display control section, the restoration monitoring section interrupts restarting the display control section and starts the display control section in a manner for coping with specific input notification information. Thus, even during the restoration processing of the display control section, the display control section is capable of executing preferentially the processing for coping with a specific external input.

As described above, in the controller according to the first embodiment, the failure monitoring section temporarily suspends updating a display, which is performed by the display update control section, and a notification of an external input, which is performed by the input notification control section, from when failure monitoring section detects a failure to when the restoration monitoring section detects completion of the restoration. Thus, it can be prevented that an unnecessary screen is displayed during the failure restoration and that malfunction caused by an input which is generated during the failure restoration arises. In addition, operability upon the failure restoration can be enhanced. Furthermore, a failure can be restored in an ensured manner regardless of whether or not an external input is generated during the failure restoration.

Although in the above-described first embodiment, the input notification section outputs an external input to the restoration monitoring section in a period from the occurrence of a failure on the display control section to the restoration from the failure, if a user's key operation or the like performed during the failure restoration is not nullified, the generated external input may be internally buffered as input notification information. And when the input notification control section, in response to the failure interruption information, starts outputting the input notification information to the display control section, the input notification section may output sequentially outputs the buffered input to the display control section. And when the restoration of the display control section is interrupted, the buffered input notification information may be discarded.

Although in the above-described first embodiment, the input notification control section controls the input notification section so as to output the input notification information to the restoration monitoring section in the period from the occurrence of a failure to the restoration from the failure, the input notification control section may control the input notification section so as to suspend outputting the input notification information at least to the display control section.

Further, although in the above-described first embodiment, the controller suspends only updating a display of display contents, the display apparatus may further comprise a sound output controller and an LED controller for executing control processing similar to that executed by the display update control section in order to temporarily suspend outputting, such as outputting of a sound on the terminal apparatus and light emission of an LED, other than updating of a display of display contents.

Further, although in the above-described first embodiment, the restoration monitoring section outputs the restoration detection information to the display update control section and the input notification control section, the restoration monitoring section may output the restoration detection information to the failure monitoring section and the failure monitoring section, in response to the outputted restoration detection information, may output to the display update control section and the input notification control section information indicating that the restoration is completed.

Further, although in the above-described first embodiment, when a specific external input is generated, the restoration monitoring section outputs the restoration interruption information to the display update control section and the input notification section, the restoration monitoring section may output the restoration interruption information to the failure monitoring section and the failure monitoring section, in response to the outputted restoration interruption information, may output to the display update control section and the input notification control section information indicating that the restoration is interrupted.

Further, in the above-described first embodiment, the restoration detection information and the restoration interruption information which are outputted to the display update control section may be same as each other.

Further, the above-described first embodiment can be realized by causing a CPU to execute a program, which is able to cause a CPU to execute the aforementioned procedure, stored in a recording medium (a ROM, a RAM, or a hard disk, etc.). In this case, the program may be executed after it is stored in a storing device via a recording medium, or may be directly executed from the recording medium. Here, the recording medium is a ROM, a RAM, a semiconductor memory such as a flash memory, a magnetic disk memory such as a flexible disk and a hard disk, an optical disk memory such as a CD-ROM, a DVD, and a BD, a memory card, or the like. The "recording medium" as mentioned herein is a notion including a communication medium such as a telephone line and a carrier line.

Further, in the above-described first embodiment, functional blocks shown in FIG. 1 may be realized as an LSI, which is an integrated circuit. These functional blocks may be constructed in a chip form, or may be constructed in a chip form so as to include a part or all of the functional blocks. The LSI mentioned herein may be referred to as an IC, a system LSI, a super LSI, or an ultra LSI, depending on the degree of integration. Also, a method of integration is not limited to LSI, and may be realized by a dedicated circuit or a general purpose processor. Also, an FPGA (Field Programmable Gate Array), which is an LSI that can be programmed after manufacture, or a reconfigurable processor enabling connections and settings of the circuit cells in the LSI to be reconfigured may be used. Further, in a case where another integration technology replacing LSI becomes available due to improvement of a semiconductor technology or due to emergence of another technology derived therefrom, integration of the functional blocks may be performed using such a new integration technology. For example, biotechnology may be applied to the integration.

Further, the above-described first embodiment may be realized as a mobile terminal apparatus. In this case, the mobile terminal apparatus may be realized as a mobile terminal apparatus having a screen, such as a mobile telephone, a PDA, a digital camera, and an in-vehicle apparatus, etc. And the mobile terminal apparatus may be realized as a mobile terminal apparatus controlling a display on an external screen such as a display apparatus, etc.

INDUSTRIAL APPLICABILITY

The controller, the mobile terminal apparatus, and the program according to the present invention are useful in a display apparatus which performs restoration from a failure by making a restart when the failure has occurred, and are applicable to an audio output apparatus or the like.

The invention claimed is:

1. A controller for controlling a display on a screen, comprising:
at least one display control section for outputting display contents to be displayed on the screen;
a display section for updating the display on the screen by displaying on the screen the display contents outputted from the at least one display control section;
a failure monitoring section for detecting that a failure has occurred in one of the at least one display control section, outputting failure detection information, and restarting the one of the at least one display control section;
a restoration monitoring section for detecting that the one of the at least one display control section has been restored from the failure and for outputting restoration detection information;
a display update control section for controlling the display section so as to, in response to the failure detection information, suspend updating the display and in response to the restoration detection information, start updating the display;
an input notification section for outputting an external input as input notification information to the one of the at least one display control section; and
an input notification control section for, in response to the outputted failure detection information, suspending outputting the input notification information to the one of the at least one display control section, which is performed by the input notification section and in response to the outputted restoration detection information, starting outputting the input notification information to the one of the at least one display control section, which is performed by the input notification section,
wherein the restoration monitoring section, when the input notification information outputted from the input notification section matches with predetermined specific input notification information, causes the one of the at least one display control section to terminate, thereafter restarts the one of the at least one display control section in a manner for coping with the predetermined specific input notification information, and outputs restoration interruption information,
wherein the input notification control section controls the input notification section so as to, in response to the outputted failure detection information, output the input notification information to the restoration monitoring section and in response to the outputted restoration interruption information, output the input notification information to the one of the at least one display control section,
wherein the display update control section controls the display section so as to start updating the display in response to the outputted restoration interruption information, and wherein the display section does not change the displayed contents on the screen after the display section is controlled so as to suspend updating the display until the display section is controlled so as to start updating the display.

2. The controller according to claim 1, wherein
the one of the at least one display control section outputs, to the restoration monitoring section, state update information which contains information indicating an internal state, each time the internal state in the one of the at least one display control section changes, and
the restoration monitoring section includes a state update information storage section for storing the state update information outputted from the one of the at least one display control section and when latest state update information stored in the state update information storage section before detecting the failure detection information matches with state update information outputted from the one of the at least one display control section after detecting the failure detection information, detects that the one of the at least one display control section has been restored from the failure.

3. The controller according to claim 2, wherein the internal state contains the display contents.

4. The controller according to claim 1, wherein
the one of the at least one display control section outputs, to the restoration monitoring section, state update information which contains information indicating the internal state, each time the internal state changes, and
the restoration monitoring section detects, when the state update information is outputted from the one of the at least one display control section after detecting the failure detection information, that the one of the at least one display control section has been restored from the failure.

5. The controller according to claim 1, wherein
the restoration monitoring section outputs restoration interruption information when a predetermined period of time has passed since the failure detection information was detected, and
the display update control section controls the display section so as to, in response to the outputted restoration interruption information, start updating the display.

6. The controller according to claim 1, wherein the failure monitoring section causes the one of the at least one display control section to terminate if the failure monitoring section detects that a failure has occurred in the one of the at least one display control section in a period from when the one of the at least one display control section is restarted to when the restoration detection information is detected.

7. A mobile terminal apparatus having a screen, comprising:
at least one display control section for outputting display contents to be displayed on the screen;
a display section for updating the display on the screen by displaying on the screen the display contents outputted from the at least one display control section;
a failure monitoring section for detecting that a failure has occurred in one of the at least one display control section, outputting failure detection information, and restarting the one of the at least one display control section;
a restoration monitoring section for detecting that the one of the at least one display control section has been restored from the failure and outputting restoration detection information;
a display update control section for controlling the display section so as to, in response to the failure detection information, suspend updating the display and in response to the restoration detection information, start updating the display;
an input notification section for outputting an external input as input notification information to the one of the at least one display control section; and
an input notification control section for, in response to the outputted failure detection information, suspending outputting the input notification information to the one of the at least one display control section, which is performed by the input notification section and in response to the outputted restoration detection information, starting outputting the input notification information to the one of the at least one display control section, which is performed by the input notification section,
wherein the restoration monitoring section, when the input notification information outputted from the input notification section matches with predetermined specific input notification information, causes the one of the at least one display control section to terminate, thereafter restarts the one of the at least one display control section in a manner for coping with the predetermined specific input notification information, and outputs restoration interruption information,
wherein the input notification control section controls the input notification section so as to, in response to the outputted failure detection information, output the input notification information to the restoration monitoring section and in response to the outputted restoration interruption information, output the input notification information to the one of the at least one display control section,
wherein the display update control section controls the display section so as to start updating the display in response to the outputted restoration interruption information, and
wherein the display section does not change the displayed contents on the screen after the display section is controlled so as to suspend updating the display until the display section is controlled so as to start updating the display.

8. A mobile terminal apparatus for controlling a display on an external screen, comprising:
at least one display control section for outputting display contents to be displayed on the screen;
a display section for updating the display on the screen by displaying on the screen the display contents outputted from the at least one display control section;
a failure monitoring section for detecting that a failure has occurred in one of the at least one display control section, outputting failure detection information, and restarting the one of the at least one display control section;
a restoration monitoring section for detecting that the one of the at least one display control section has been restored from the failure and outputting restoration detection information;
a display update control section for controlling the display section so as to, in response to the failure detection information, suspend updating the display and in response to the restoration detection information, start updating the display;
an input notification section for outputting an external input as input notification information to the one of the at least one display control section; and an input notification control section for, in response to the outputted failure detection information, suspending outputting the input notification information to the one of the at least one display control section, which is performed by the input notification section and in response to the outputted restoration detection information, starting outputting the input notification information to the one of the at least one display control section, which is performed by the input notification section, wherein the restoration monitoring section, when the input notification information outputted from the input notification section matches with predetermined specific input notification information, causes the one of the at least one display control section to terminate, thereafter restarts the one of the at least one display control section in a manner for coping with the predetermined specific input notification information, and outputs restoration interruption information, wherein the input notification control section controls the input notification section so as to, in response to the outputted failure detection information, output the input notification information to the restoration monitoring section and in response to the outputted restoration interruption information, output the input notification information to the one of the at least one display control section, wherein the display update control section controls the display section so as to start updating the display in response to the outputted restoration interruption information, and wherein the display section does not change the displayed contents on the screen after the display section is controlled so as to suspend updating the display until the display section is controlled so as to start updating the display.

9. A non-transitory computer-readable medium having stored thereon a program for causing a terminal apparatus having a screen to function as:

at least one display control means for outputting display contents to be displayed on the screen;

a display means for updating the display on the screen by displaying on the screen the display contents outputted from the at least one display control means;

a failure monitoring means for detecting that a failure has occurred in one of the at least one display control means, outputting failure detection information, and restarting the one of the at least one display control means;

a restoration monitoring means for detecting that the one of the at least one display control means has been restored from the failure and outputting restoration detection information;

a display update control means for controlling the display means so as to, in response to the failure detection information, suspend updating the display and in response to the restoration detection information, start updating the display; wherein an input notification means for outputting an external input as input notification information to the one of the at least one display control means; and an input notification control means for, in response to the outputted failure detection information, suspending outputting the input notification information to the one of the at least one display control means, which is performed by the input notification means and in response to the outputted restoration detection information, starting outputting the input notification information to the one of the at least one display control means, which is performed by the input notification means, wherein the restoration monitoring means, when the input notification information outputted from the input notification means matches with predetermined specific input notification information, causes the one of the at least one display control means to terminate, thereafter restarts the one of the at least one display control means in a manner for coping with the predetermined specific input notification information, and outputs restoration interruption information, wherein the input notification control means controls the input notification means so as to, in response to the outputted failure detection information, output the input notification information to the restoration monitoring means and in response to the outputted restoration interruption information, output the input notification information to the one of the at least one display control means, wherein the display update control means controls the display means so as to start updating the display in response to the outputted restoration interruption information, and wherein the display means does not change the displayed contents on the screen after the display means is controlled so as to suspend updating the display until the display means is controlled so as to start updating the display.

10. An integrated circuit for controlling a display on a screen, wherein integrated are circuits functioning as:

at least one display control section for outputting display contents to be displayed on the screen;

a display section for updating the display on the screen by displaying on the screen the display contents outputted from the at least one display control section;

a failure monitoring section for detecting that a failure has occurred in one of the at least one display control section, outputting failure detection information, and restarting the one of the at least one display control section;

a restoration monitoring section for detecting that the one of the at least one display control section has been restored from the failure and outputting restoration detection information;

a display update control section for controlling the display section so as to, in response to the failure detection information, suspend updating the display and in response to the restoration detection information, start updating the display;

an input notification section for outputting an external input as input notification information to the one of the at least one display control section; and an input notification control section for, in response to the outputted failure detection information, suspending outputting the input notification information to the one of the at least one display control section, which is performed by the input notification section and in response to the outputted restoration detection information, starting outputting the input notification information to the one of the at least one display control section, which is performed by the input notification section, wherein the restoration monitoring section, when the input notification information outputted from the input notification section matches with predetermined specific input notification information, causes the one of the at least one display control section to terminate, thereafter restarts the one of the at least one display control section in a manner for coping with the predetermined specific input notification information, and outputs restoration interruption information, wherein the input notification control section controls the input notification section so as to, in response to the outputted failure detection information, output the input notification information to the restoration monitoring section and in response to the outputted restoration interruption information, output the input notification information to the one of the at least one display control section, wherein the display update control section controls the display section so as to start updating the display in response to the outputted restoration interruption information, and wherein the display section does not change the displayed contents on the screen after the display section is controlled so as to suspend updating the display until the display section is controlled so as to start updating the display.

* * * * *